(12) United States Patent
Ookubo et al.

(10) Patent No.: US 11,337,273 B2
(45) Date of Patent: May 17, 2022

(54) USER APPARATUS AND BASE STATION

(71) Applicant: NTT DOCOMO, INC., Tokyo (JP)

(72) Inventors: Naoto Ookubo, Tokyo (JP); Huiling Jiang, Tokyo (JP); Liu Liu, Beijing (CN); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/339,022

(22) PCT Filed: Oct. 3, 2017

(86) PCT No.: PCT/JP2017/035917
§ 371 (c)(1),
(2) Date: Apr. 3, 2019

(87) PCT Pub. No.: WO2018/066537
PCT Pub. Date: Apr. 12, 2018

(65) Prior Publication Data
US 2019/0230739 A1    Jul. 25, 2019

(30) Foreign Application Priority Data

Oct. 6, 2016  (JP) .............................. JP2016-198532

(51) Int. Cl.
*H04W 88/06* (2009.01)
*H04L 5/00* (2006.01)
(Continued)

(52) U.S. Cl.
CPC .......... *H04W 88/06* (2013.01); *H04L 5/0044* (2013.01); *H04L 5/0094* (2013.01); *H04W 72/04* (2013.01);
(Continued)

(58) Field of Classification Search
CPC ... H04W 88/06; H04W 72/04; H04W 72/042; H04W 72/0453; H04W 88/08; H04L 5/0044; H04L 5/0094
(Continued)

(56) References Cited

U.S. PATENT DOCUMENTS

| 2011/0085513 A1* | 4/2011 | Chen .................... H04L 5/0053 370/330 |
| 2013/0121278 A1* | 5/2013 | Noh ...................... H04W 72/04 370/329 |

(Continued)

FOREIGN PATENT DOCUMENTS

| EP | 2486769 A1 | 8/2012 |
| WO | 2011/044494 A1 | 4/2011 |

OTHER PUBLICATIONS

International Search Report issued in PCT/JP2017/035917 dated Dec. 26, 2017 (4 pages).
(Continued)

*Primary Examiner* — Kwang B Yao
*Assistant Examiner* — Xuan Lu
(74) *Attorney, Agent, or Firm* — Osha Bergman Watanabe & Burton LLP

(57) ABSTRACT

A user apparatus in a radio communication system including a base station and the user apparatus includes: a receiver unit configured to receive, from the base station, first designation information for designating a resource group including a plurality of resources each including a bandwidth of a predetermined number of resource blocks and second designation information for designating allocation resources in the resource group; and a communication unit configured to perform data communication using the allocation resources
(Continued)

designated by the second designation information in the resource group designated by the first designation information.

10 Claims, 19 Drawing Sheets

(51) Int. Cl.
    *H04W 72/04*     (2009.01)
    *H04W 88/08*     (2009.01)

(52) U.S. Cl.
    CPC ..... *H04W 72/042* (2013.01); *H04W 72/0453* (2013.01); *H04W 88/08* (2013.01)

(58) Field of Classification Search
    USPC .......................................................... 370/329
    See application file for complete search history.

(56) References Cited

U.S. PATENT DOCUMENTS

| | | | | |
|---|---|---|---|---|
| 2017/0245313 | A1* | 8/2017 | Kim | H04L 5/0092 |
| 2019/0222405 | A1* | 7/2019 | Wong | H04L 5/0041 |
| 2019/0327718 | A1* | 10/2019 | Fang | H04W 72/042 |
| 2020/0383113 | A1* | 12/2020 | Yang | H04W 4/80 |

OTHER PUBLICATIONS

Written Opinion of the International Searching Authority issued in PCT/JP2017/035917 dated Dec. 26, 2017 (4 pages).
ZTE; "Support of larger TBS and larger PDSCH/PUSCH bandwidth for MTC"; 3GPP TSG RAN WG1 Meeting #86, R1-167319; Gothenburg, Sweden; Aug. 22-26, 2016 (9 pages).
Qualcomm Incorporated; "Support of larger data channel bandwidth"; 3GPP TSG RAN WG1 Meeting #86, R1-166297; Gothenburg, Sweden; Aug. 22-26, 2016 (4 pages).
3GPP TS 36.101 V13.4.0; "3rd Generation Partnership Project; Technical Specification Group Radio Access Network; Evolved Universal Terrestrial Radio Access (E-UTRA); User Equipment (UE) radio transmission and reception (Release 13)"; Jun. 2016 (1035 pages).
Japanese Office Action in corresponding Application No. 2016-198532 dated Jan. 9, 2018 (5 pages).
Bangladeshi Office Action in corresponding Application No. 219/2017 dated Dec. 5, 2018 (1 page).
Pakistani Office Action in corresponding Application No. 507/2017 dated Dec. 21, 2018 (2 pages).
Extended European Search Report issued in counterpart European Patent Application No. 17858375.3, dated Jul. 16, 2019 (8 Pages).
Extended European Search Report issued in counterpart European Patent Application No. 17858375.3, dated Feb. 15, 2021 (8 pages).

* cited by examiner

FIG.4

| BANDWIDTH | 5 MHz | 10 MHz | 15 MHz | 20 MHz |
|---|---|---|---|---|
| NUMBER OF DL RBs $N_{RB}^{DL}$ | 25 | 50 | 75 | 100 |
| NUMBER OF DL NarrowBands $N_{NB}^{DL}$ | 4 | 8 | 12 | 16 |
| $N_{RB}^{DL}$ mod 2 * | 1 | 0 | 1 | 0 |

* ARRANGEMENT OF NB Index IS DIFFERENT WHEN NUMBER OF DL RBs IS ODD/EVEN NUMBERS

FIG.9

| Bandwidth | 5 MHz | 10 MHz | 15 MHz | 20 MHz |
|---|---|---|---|---|
| Number of NBs | 4 | 8 | 12 | 16 |
| Number of NBGs ($N_{NBG}$) | 1 | 2 | 3 | 4 |

FIG.11

| Bandwidth | 5 MHz | 10 MHz | 15 MHz | 20 MHz |
|---|---|---|---|---|
| Number of NBs | 4 | 8 | 12 | 16 |
| Possible starting index (N_NB-3) | 1 | 5 | 9 | 13 |

FIG.13

| Bandwidth | BW | 6-1A (reference) | EXAMPLE 1-1 + 1-3 | EXAMPLE 1-1 + 1-4 | EXAMPLE 1-2 + 1-3 | EXAMPLE 1-2 + 1-4 |
|---|---|---|---|---|---|---|
| Number of bits for resource block assignment in format | 5 MHz | 7 | 9 (0 + 9) | 5 (0+5) | 9 (0+9) | 5 (0+5) |
| | 10 MHz | 8 | 10 (1 + 9) | 6 (1+5) | 12 (3+9) | 8 (3+5) |
| | 15 MHz | 9 | 11 (2 + 9) | 7 (2+5) | 13 (4+9) | 9 (4+5) |
| | 20 MHz | 9 | 11 (2 + 9) | 7 (2+5) | 13 (4+9) | 9 (4+5) |
| Flexibility | | — | Medium | Low | High | Medium |

FIG.15

| INFORMATION ELEMENT | NUMBER OF Bits | DETAILS |
|---|---|---|
| Flag for format 6-0A/format 6-1A differentiation | 1 bit | Flag FOR IDENTIFYING DCI format 6-0A AND DCI format 6-1A (SINCE 6-0A AND 6-1A ALWAYS HAVE THE SAME NUMBER OF BITs) |
| Frequency hopping flag | 1 bit | PRESENCE OR ABSENCE OF Frequency Hopping |
| Resource block assignment | $\left\lceil log_2 \left\lceil \frac{N_{RB}^{DL}}{6} \right\rceil \right\rceil$ + 5 bit | 5 bits FROM LSB: RB allocation IN NB OTHERS: POSITION OF Narrow band |
| Modulation and coding scheme | 4 bit | MODULATION SCHEME AND ENCODING RATE |
| Repetition number | 2 bit | Repetition NUMBER index OF PDSCH |
| HARQ process number | 3 bit (FDD), 4 bit (TDD) | PROCESS NUMBER OF HARQ |
| New data indicator | 1 bit | Flag INDICATING NEW/RE-TRANSMISSION |
| Redundancy version | 2 bit | INITIAL VALUE OF RV |
| TPC command for scheduled PUCCH | 2 bit | TPC command FOR PUCCH |
| Downlink Assignment Index(DAI) | 2 bit | NUMBER OF ACKs/NACKs BUNDLED IN TDD |
| Antenna port(s) and scrambling identity | 2 bit (only for TM9) | DESIGNATION OF NUMBER OF Layers |
| SRS request | 1 bit | Flag ON WHETHER TO TRANSMIT Aperiodic SRS USING PUSCH |
| TPMI information for precoding | 2 or 4 bit (only for TM6) | PMI OF PDSCH |
| PMI confirmation for precoding | 1 bit (only for TM6) | SELECT PMI OR TPMI FOR UE REPORT |
| HARQ-ACK resource offset | 2 bit | DEGREE OF offset OF PUCCH resources |
| DCI subframe repetition number | 2 bit | Repetition NUMBER OF DCI |

USER APPARATUS AND BASE STATION

TECHNICAL FIELD

The present invention relates to a user apparatus and a base station in a radio communication system.

BACKGROUND ART

In 3rd generation partnership project (3GPP), LTE-based extension of techniques for IoT such as a smart meter in addition to an increase in radio speed and capacity of LTE has been studied. Particularly, in the specification of Release 13, Category M1 is supported as a category of a low-price terminal for IoT (hereinafter, referred to as user apparatus). In Category M1, a transmission and reception bandwidth of a user apparatus is limited to six resource blocks (RBs) and a data rate is limited to 1 Mbps (for example, see Non-Patent Document 1).

CITATION LIST

Non-Patent Document

Non-Patent Document 1: 3GPP TS 36.101 V13.4.0

SUMMARY OF THE INVENTION

Problem to be Solved by the Invention

A wearable device capable of performing voice communication or the like in addition to a smart meter is assumed as the user apparatus for IoT. However, such a device requires a data rate higher than 1 Mbps and cannot be coped with by Category M1. Therefore, in standardization of the 3GPP, an increase in data rate of Category M1 has been studied.

In order to increase a data rate, a user apparatus needs to perform transmission and reception with a bandwidth larger than the bandwidth of six RBs (1.08 MHz), but a specific technique for performing transmission and reception in a wideband wider than the bandwidth of six RBs on the basis of techniques for narrowband such as Category M1 has not been proposed yet.

The invention is made in consideration of the above-mentioned circumstances and an object thereof is to provide a technique for enabling a user apparatus supporting narrowband communication to perform wideband communication in a radio communication system which supports the narrowband communication.

Means for Solving Problem

According to a technique disclosed herein, there is provided a user apparatus in a radio communication system including a base station and the user apparatus, the user apparatus including: a receiver unit configured to receive, from the base station, first designation information for designating a resource group including a plurality of resources each having a bandwidth of a predetermined number of resource blocks and second designation information for designating allocation resources in the resource group; and a communication unit configured to perform data communication using the allocation resources designated by the second designation information in the resource group designated by the first designation information.

Effect of the Invention

According to the disclosed technique, it is possible to provide a technique for enabling a user apparatus supporting narrowband communication to perform wideband communication in a radio communication system which supports the narrowband communication.

BRIEF DESCRIPTION OF DRAWINGS

FIG. 4 is a diagram illustrating narrowband indices;

FIG. 9 is a diagram illustrating the number of NBs and the number of NBGs for each bandwidth in Example 1-1;

FIG. 11 is a diagram illustrating the number of NBs and the number of NBGs for each bandwidth in Example 1-2;

FIG. 13 is a diagram illustrating the number of bits for each scheme;

FIG. 15 is a diagram illustrating DCI format 6-1A;

MODES FOR CARRYING OUT THE INVENTION

Hereinafter, an embodiment of the invention (this embodiment) will be described with reference to the accompanying drawings. The embodiments described below are only examples and embodiments of the invention are not limited to the following embodiments.

A base station 20 and a user apparatus 10 in a radio communication system according to this embodiment can perform operations based on a communication scheme of LTE (which includes LTE-Advanced and 5G subsequent thereto) unless they are incompatible with techniques described in this embodiment. Accordingly, in operation of the radio communication, existing techniques defined in the LTE can be appropriately used. The existing techniques are not limited to the LTE. The invention can be applied to a communication scheme other than the LTE.

In the following embodiment, terms MPDCCH, PDSCH, PUSCH, PRB, RB, Narrowband, and the like which are used in the LTE are appropriately used, but these terms are only an example, the same channels or signals as the terms (for example, which are equal or substantially equal in view of function, operation, sequence, specification, and characteristic) may be referred to as other names.

<Whole System Configuration>

Figure 1:
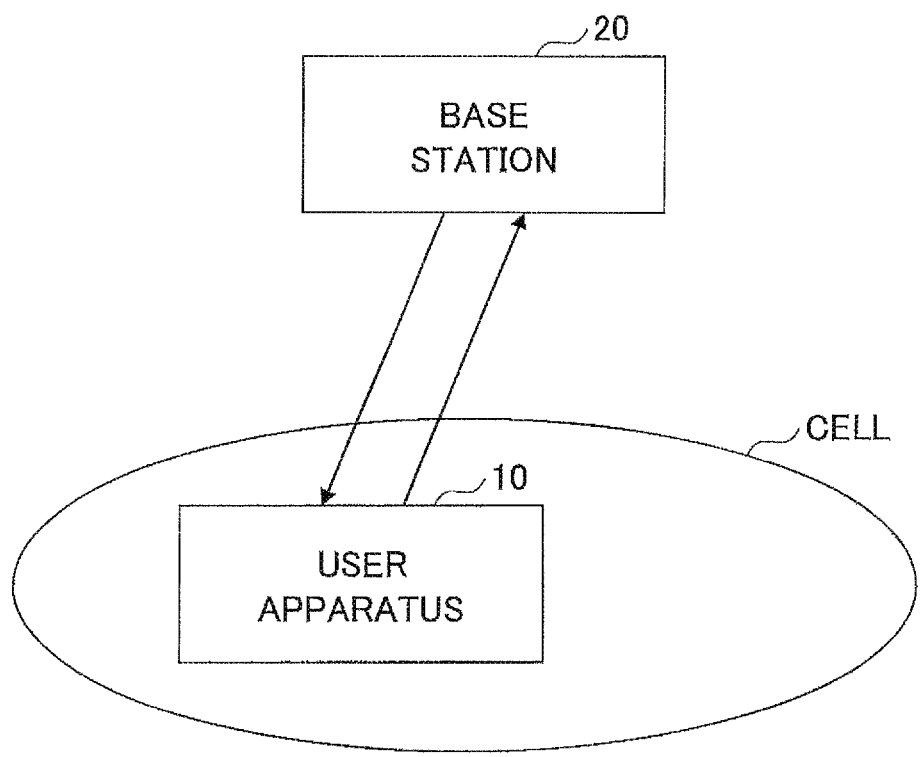
FIG. 1 is a diagram illustrating a configuration of a radio communication system according to an embodiment of the invention.

FIG. 1 is a diagram illustrating a configuration of a radio communication system according to this embodiment. As illustrated in FIG. 1, the radio communication system according to this embodiment includes a user apparatus 10 and a base station 20. One user apparatus 10 and one base station 20 are illustrated in FIG. 1, but this is only an example and two or more user apparatuses and two or more base stations may be present.

The base station 20 operates in a certain channel bandwidth (for example, 20 MHz) in each of an UL (uplink) and a DL (downlink) among six types of system bandwidths (which may be referred to as a channel bandwidth) defined in the LTE (Non-Patent Document 1). This is only an example, a system bandwidth other than the six types of system bandwidths defined in the LTE may be used. Each of the user apparatus 10 and the base station 20 supports at least Category M1 and can perform operations corresponding to Category M1.

(Category M1)

Since a technique according to this embodiment is based on techniques associated with Category M1 as an example of categories supporting narrowband communication, an outline of a communication scheme in Category M1 will be first described below.

A bandwidth which can be used for a user apparatus in Category M1 for transmission and reception is six RBs at the maximum. A band with the bandwidth of six RBs is referred to as a narrowband (a narrow band). Since reception of six RBs is performed at the maximum, an MTC physical downlink control channel (MPDCCH) which is a dedicated downlink control channel is supported and coverage extension using a repetition technique and frequency hopping is realized.

Figure 2:
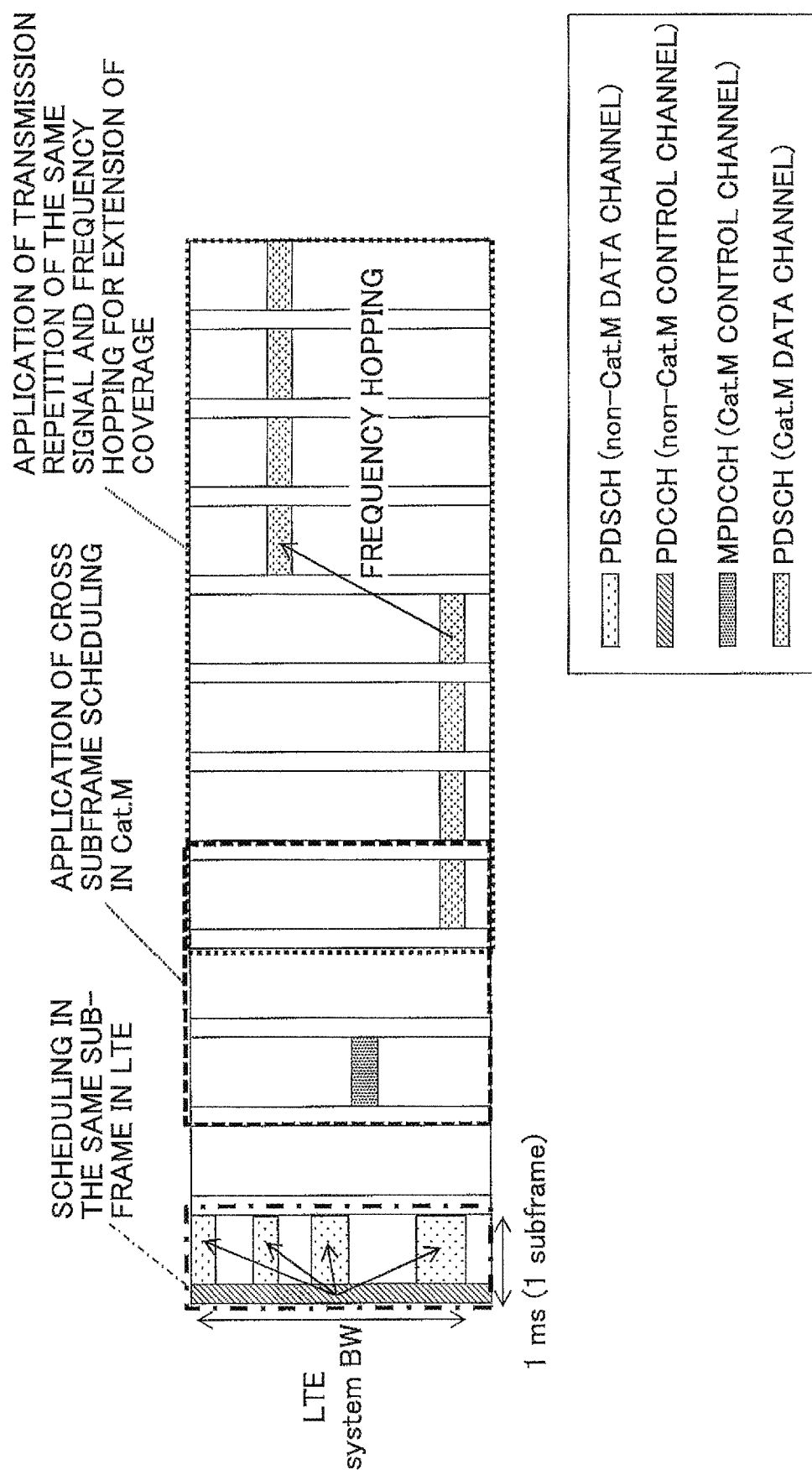
FIG. 2 is a diagram illustrating a communication scheme in Category M1.

FIG. 2 illustrates a channel configuration of a physical layer of Category M1. As illustrated in FIG. 2, in the convention LTE, scheduling of a PDSCH using a PDCCH in the same subframe is performed. On the other hand, in Category M1, allocation of a PDSCH in a different subframe is performed using an MPDCCH in a certain subframe and repetition and frequency hopping of the PDSCH are performed. A frequency allocation position of the PDSCH is variable for every six RBs in a system bandwidth.

FIG. 2 illustrates a DL, but resource allocation of an UL data channel (PUSCH) is basically the same as resource allocation of a PDSCH illustrated in FIG. 2.

Figure 3:
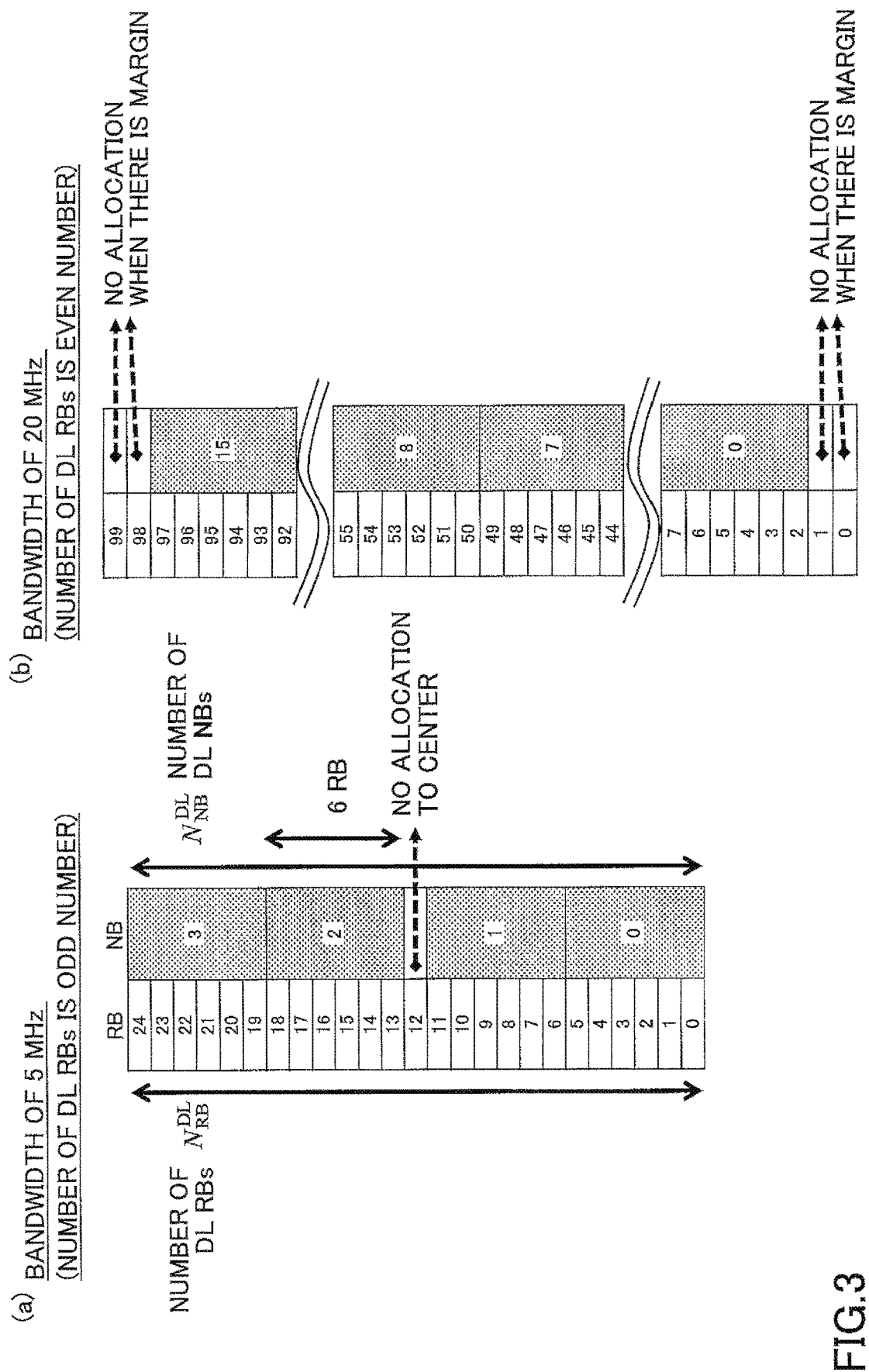
FIG. 3 is a diagram illustrating narrowband indices.

FIG. 3 illustrates a relationship between RBs and narrowbands (abbreviated to NB) defined in LTE, where indices of narrowbands are associated with indices of RBs. FIG. 3 illustrates an example of a DL, but the same is basically true for an UL. FIG. 3(a) illustrates a case in which the system bandwidth is 5 MHz, and FIG. 3(b) illustrates a case in which the system bandwidth is 20 MHz. As illustrated in the drawing, one NB is defined for every six RBs in any case. FIG. 4 illustrates a relationship between the system bandwidth, the number of RBs, and the number of NBs.

Figure 5:
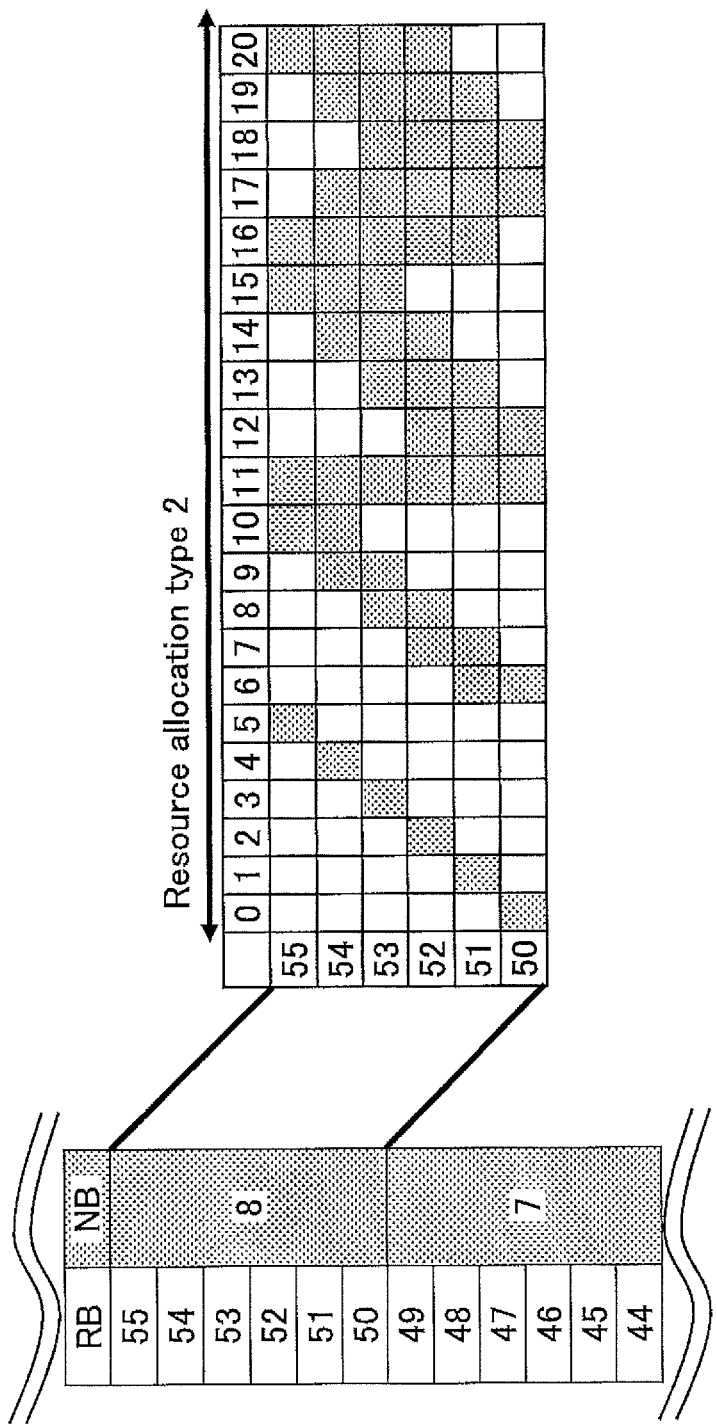
FIG. 5 is a diagram illustrating an example of resource allocation in a narrowband.

In Category M1, designation of an NB (which is a bundle of six RBs and which may be considered to be a group of six continuous RBs without overlapping in an UL and a DL) and designation of an RB in the NB are performed for the user apparatus by downlink control information (DCI) which is transmitted using an MPDCCH. As illustrated in FIG. 5, Resource allocation type 2 is used for designation of an RB. In Resource allocation type 2, one of 21 (=6(6+1)/2) predetermined allocation patterns is selected and five-bit information which can express the 21 patterns is notified to the user apparatus. For example, when "5" is notified, it means that one RB of 55 is allocated. Designation of an RB in an UL may be performed in the same way as in a DL. The name of the allocation method may not be Resource allocation type 2. Hereinafter, a name "Resource allocation type 2" is used in both an UL and a DL for the purpose of convenience.

Basic Processes in the Present Embodiment

Figure 6:
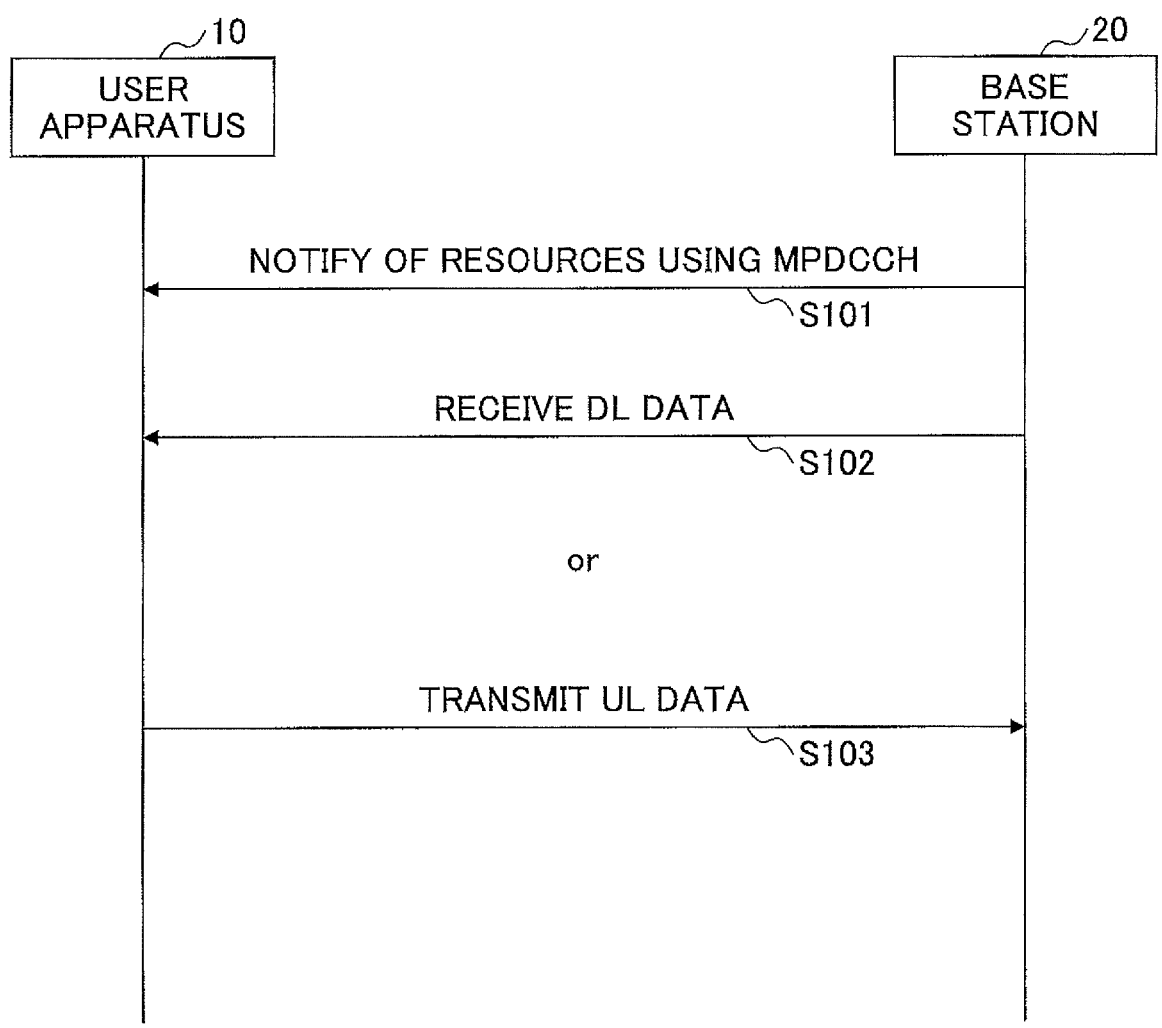
FIG. 6 is a diagram illustrating a basic process according to an embodiment of the invention.

Basic processing operations of the user apparatus 10 and the base station 20 in this embodiment will be described below with reference to FIG. 6. FIG. 6 illustrates a case in which the user apparatus 10 performs transmission and reception of data. In this specification, "communication" may be generically used for transmission and reception of data. Unless otherwise specified, "communication" means "transmission" or "reception" and thus may be interpreted to be "transmission" or may be interpreted to be "reception."

In Step S101, the base station 20 notifies the user apparatus 10 of resources, which are used for communication of data by the user apparatus 10, using an MPDCCH. In this embodiment, a bandwidth broader than six RBs can be designated as a bandwidth of the resources.

The user apparatus 10 receiving notification of resources by the MPDCCH receives data (Step S102) or transmits data (step S103) using the resources. The base station 20 transmits data (Step S102) or receives data (Step S103) using the resources.

In this embodiment, a band with a broad (maximum) bandwidth which is designated from the base station 20 to the user apparatus 10 is referred to as a wideband (or a wider band). In this embodiment, basically, the bandwidth of the wideband is set to a bandwidth of four NBs (=24 RBs), but this is an example and a bandwidth other than four NBs may be used. For example, the bandwidth of the wideband may be a certain value of three NBs to 16 NBs (for example, 12 NBs).

A mode in which the user apparatus 10 performs communication using the narrowband (six RBs) is referred to as a narrowband mode, and a mode in which the user apparatus 10 performs communication using the wideband (four NBs) is referred to as a wideband mode.

Example 1 and Example 2 will be described below as a specific operation example of this embodiment. Example 1 is an example in which the narrowband mode or the wideband mode is semi-statically designated from the base station 20 to the user apparatus 10. Example 2 is an example in which the narrowband mode or the wideband mode is dynamically designated from the base station 20 to the user apparatus 10.

Example 1

First, an outline of processing in Example 1 will be described with reference to FIG. 7. In Step S201, an operation in the wideband mode or an operation in the narrowband mode is instructed from the base station 20 to the user apparatus 10. In Example 1, it is assumed that the wideband mode is instructed. The instruction of a mode is performed, for example, using system information (MIB or SIB) or RRC signaling radio configuration information in establishing RRC connection.

In Step S202, notification of resources from the base station 20 to the user apparatus 10 is performed using an MPDCCH. What resources (RB, NB, or the like) in what wideband (for example, a band with a bandwidth of four NBs) in a system band to use is designated by the notification of resources. Length and/or position of a subframe and/or a slot may be designated as a length and/or a position in a time domain of the resources. For example, a subframe (for example, one subframe after two subframes from the MPDCCH) with predetermined position and length may be used as a time position and a time length of the resources so that the time position of the resources may not be notified from the base station 20 to the user apparatus 10. Allocation of resources in Example 1 and Example 2 will be described below with a focus on a frequency direction.

In Step S203, the user apparatus 10 performs data communication using the resources designated in Step S202. The base station 20 also performs data communication using the resources. An arrow end is attached to both ends of the line of Step S203 in FIG. 7, which denotes transmission or reception by the user apparatus 10 (or the base station 20). The same is true of the other sequence diagrams.

In wideband communication in Example 1 (Example 2), the same repetition and/or frequency hopping as in Category M1 may be performed or may not be performed. Whether to perform repetition and/or frequency hopping may be notified to the user apparatus 10 using an MPDCCH.

Example 1-1 and Example 1-2 will be described below as an example of a method of designating a frequency position in a wideband (a wider band) in notification of resources using an MPDCCH. Example 1-3 and Example 1-4 will be described below as an example of a method of designating resources in a wideband in notification of resources using an MPDCCH.

Example 1-1

Example 1-1 which is a first example of the method of designating a frequency position in a wideband in notification of resources using an MPDCCH will be described below.

In Example 1-1, four continuous narrowbands (NBs) each including six physical resource blocks (PRBs) are defined as one narrowband group (NBG) which is used as the above-mentioned wideband. A narrowband may be referred to as a narrow band. A narrowband group may be referred to as a narrow band group or a narrow band group. The number of PRBs included in one narrowband may not be limited to six.

An index (number) indicating a frequency position in the system bandwidth is assigned to each NBG. For example, an index of an NBG corresponding to four NBs with an index of 0 to 3 may be set to 0, and an index of an NBG corresponding to four NBs with an index of 4 to 7 may be set to 1. Subsequent indices are set to increase by one for every four NBs. This method of assigning an index is only an example.

The user apparatus 10 and the base station 20 ascertain a correlation among RBs, NBs, and NBGs for each system bandwidth. For example, when an index of an NBG is designated by the base station 20 in a serving cell, the user apparatus 10 can ascertain NBs and RBs corresponding to the NBG in the system bandwidth of the serving cell.

Figure 8:
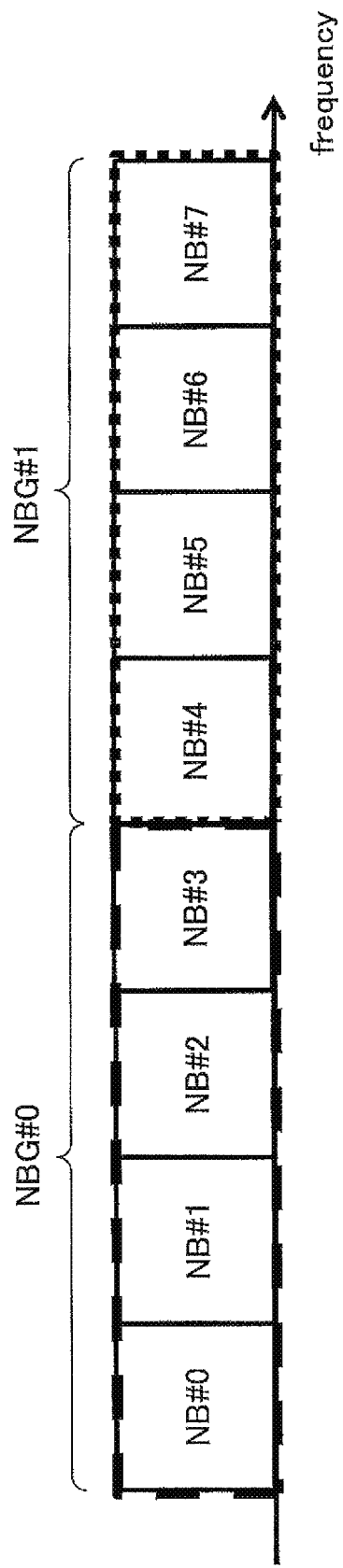
FIG. 8 is a diagram illustrating an example of an NBG index in Example 1-1.

FIG. 8 is a diagram illustrating an example of NBG indices when the system bandwidth is 10 MHz. As illustrated in FIG. 8, when the system bandwidth is 10 MHz (the number of NBs is eight), four NBs with an index of 0 to 3 are included in an NBG with an index of 0, and four NBs with an index of 4 to 7 are included in an NBG with an index of 1.

Figure 7:
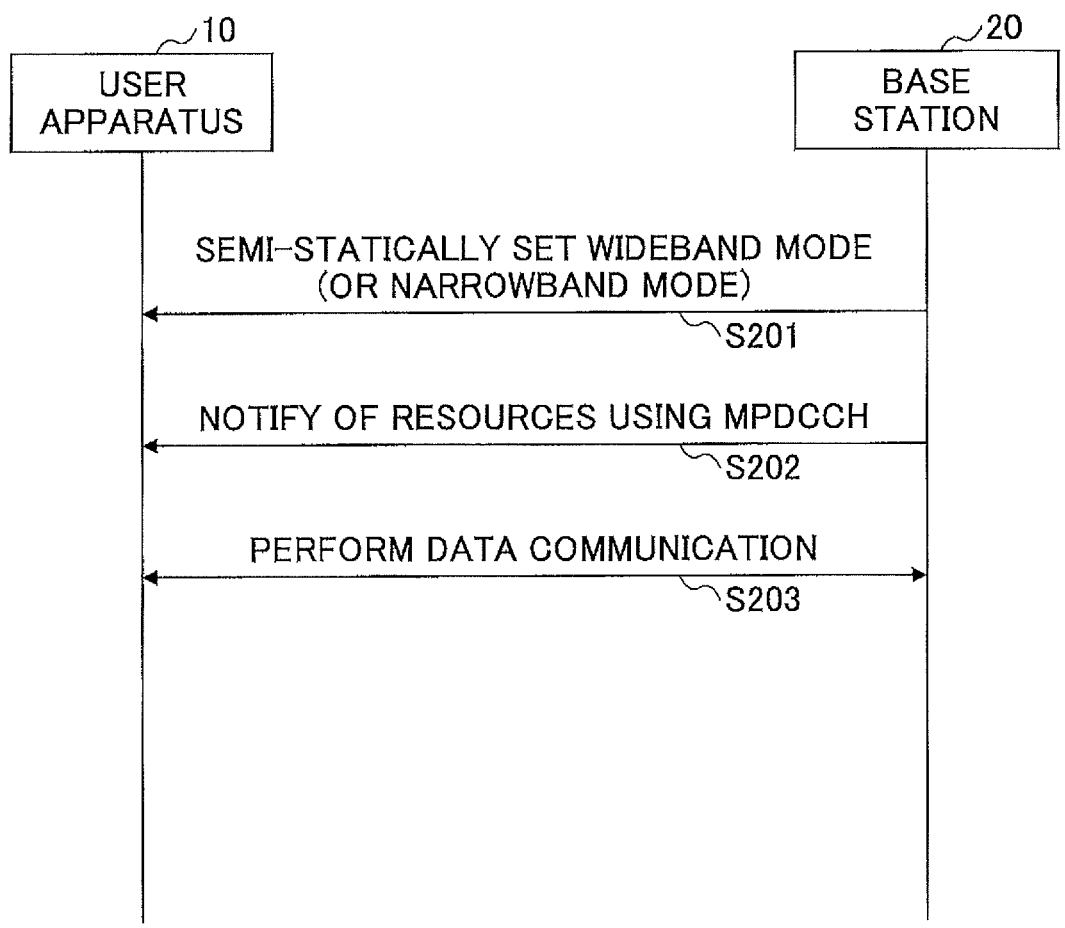
FIG. 7 is a diagram illustrating an outline of a process in Example 1.

In Step S202 illustrated in FIG. 7, an index of one NBG including resources allocated to the user apparatus 10 is notified from the base station 20 to the user apparatus 10 using an MPDCCH.

When the number of NBGs in a certain system bandwidth is defined as $N_{NBG}$, the number of bits required for expressing an index of an NBG which is notified using an MPDCCH is expressed by the following expression. That is, the number of bits is used to notify of an NBG using the MPDCCH.

$$\lceil \log_2(N_{NBG}) \rceil \text{bits} \qquad \text{[Expression 1]}$$

This expression means a ceiling (an integer in which digits after the decimal point are rounded up) of $\log_2(N_{NBG})$. The number of NBs and the number of NBGs for each system bandwidth in Example 1-1 are illustrated in FIG. 9. In the example illustrated in FIG. 9, in the case of 5 MHz, the number of bits required for notification of an NBG is 0. That is, in the case of 5 MHz, since only one NBG is present, it is not necessary to notify of the NBG. In the case of 10 MHz, 15 MHz, and 20 MHz, one bit, two bits, and two bits are used for notification of NBGs, respectively.

As described above, by introducing an NBG into which NBs are grouped, it is possible to avoid a large increase in an amount of information of a control signal.

Example 1-2

Example 1-2 which is another example of the method of designating a frequency position in a wideband in resource notification using an MPDCCH will be described below.

Also in Example 1-2, four continuous NBs each including six physical resource blocks (PRBs) are defined as one NBG, similarly to Example 1-1.

In Example 1-2, Step S202 illustrated in FIG. 7, a start position of one NBG including resources allocated to the user apparatus 10 is notified from the base station 20 to the user apparatus 10 using an MPDCCH. The start position corresponds to a minimum index among four indices of four NBs constituting the NBG.

Figure 10:
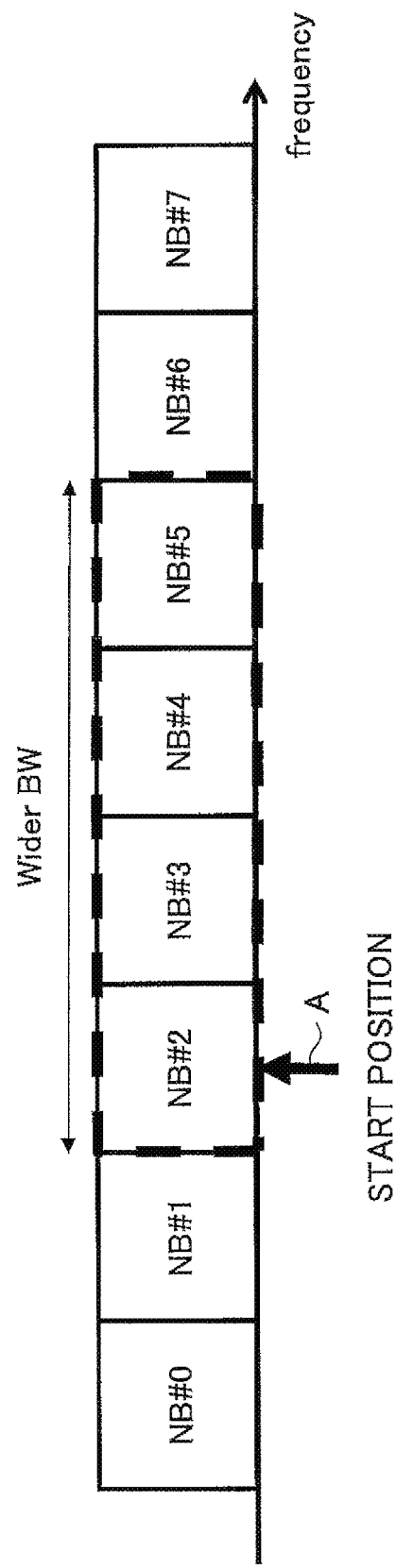
FIG. 10 is a diagram illustrating an example of an NBG start position in Example 1-2.

FIG. 10 illustrates a start position (A) of an NBG when the system bandwidth is 10 MHz and the NBG including NBs with an index of 2 to 5 is notified to the user apparatus 10. In this case, 2 is notified as the start position. The user apparatus 10 receiving the start position determines that an NBG including four NBs starting from the NB with an index of 2 is designated.

In the example illustrated in FIG. 10, one of 0, 1, 2, 3, and 4 can be designated as an index of an NB at the start position. When an NB index equal to or larger than 5 is designated, an NBG including four NBs cannot be constituted and thus an NB index equal to or larger than 5 cannot be designated. However, when NBs less than 4 NBs are permitted as an NBG on the assumption that an NB index equal to or larger than 5 is designated, an NB index equal to or larger than 5 may be designated.

When the number of NBs in a certain system bandwidth is defined as $N_{NB}$, the number of bits required for expressing a start position of an NBG which is notified using an MPDCCH is expressed by the following expression. That is, the number of bits is used to notify of a start position of an NBG using the MPDCCH.

$$\lceil \log_2(N_{NB}-3) \rceil \text{bits} \qquad \text{[Expression 2]}$$

This expression means a ceiling (an integer in which digits after the decimal point are rounded up) of $\log_2(N_{NB}-3)$. The number of NBs and the number of start positions of NBGs for each system bandwidth in Example 1-2 are illustrated in FIG. 11. In the example illustrated in FIG. 11, in the case of 5 MHz, the number of bits required for notification of a start position of an NBG is 0. That is, in the case of 5 MHz, since only one NBG is present, it is not necessary to notify of the NBG. In the case of 10 MHz, 15 MHz, and 20 MHz, three bits, four bits, and four bits are used to notify of start positions of NBGs, respectively.

Also in Example 1-2, by introducing an NBG into which NBs are grouped, it is possible to avoid a large increase in an amount of information of a control signal.

Example 1-3

Next, Example 1-3 will be described below as a first example of the method of designating resources in a wideband (an NBG in Example 1-1 and Example 1-2) in notification of resources using an MPDCCH. Example 1-3 may be applied to the NBG designating method according to Example 1-1, may be applied to the NBG designating method according to Example 1-2, or may be applied to an NBG designating method other than Examples 1-1 and 1-2.

In Example 1-3, the base station 20 allocates resources to be allocated to the user apparatus 10 (which are used for data communication by the user apparatus 10) in an NBG allocated to the user apparatus 10 in units of PRBs. Then, in Step S202 illustrated in FIG. 7, the allocated resources are notified from the base station 20 to the user apparatus 10 using an MPDCCH.

As an example of a method of expressing allocation resources in an NBG, there is a method of allocating a bit to each of 24 PRBs (six PRBs×four NBs) constituting the NBG to represent the resources using a bitmap of 24 bits.

The base station 20 may allocate resources (PRBs) in the NBG to the user apparatus 10 using Resource allocation type 2 in which (24(24+1)/2) allocation patterns are present for 24 PRBs. In this case, in Step S202 illustrated in FIG. 7, information of nine bits which is the number of bits (the following expression) capable of expressing (24(24+1)/2) is transmitted from the base station 20 to the user apparatus 10 for notification of resources in the NBG.

$$\left\lceil \log_2\left(\frac{24(24+1)}{2}\right) \right\rceil = 9 \text{ bits} \qquad \text{[Expression 3]}$$

In Example 1-3, allocation is performed in units of PRBs and it is thus possible to perform flexible allocation.

Example 1-4

Next, Example 1-4 will be described below as another example of the method of designating resources in a wideband (an NBG in Example 1-1 and Example 1-2) in notification of resources using an MPDCCH. Example 1-4 may be applied to the NBG designating method according to Example 1-1, may be applied to the NBG designating method according to Example 1-2, or may be applied to an NBG designating method other than Examples 1-1 and 1-2.

In Example 1-4, the base station 20 performs resource allocation in units of resource block groups (RBGs) each including a predetermined number of continuous PRBs in the NBG allocated to the user apparatus 10.

Figure 12:
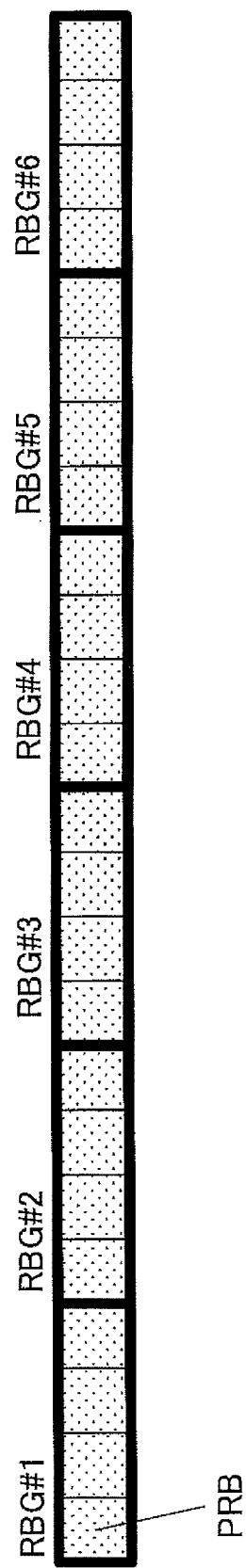
FIG. 12 is a diagram illustrating an example of an RBG in Example 1-4.

One RBG includes, for example, four continuous PRBs. In this case, as illustrated in FIG. 12, six RBGs are present in one NBG (24 PRBs). As illustrated in FIG. 12, for example, indices are assigned to the RBGs from the side of PRB having a smallest index. When an index is received from the base station 20, the user apparatus 10 can ascertain frequency positions of an RBG (a bundle of four PRBs) corresponding to the received index and can perform data communication using the RBG.

As described above, since four continuous PRBs constitute one resource block group (RBG), a unit for allocation is only multiples of four PRBs.

In the above-mentioned example, four continuous PRBs are defined as one RBG, but this is only an example. For example, six continuous PRBs may be defined as one RBG, or continuous PRBs of a number other than 4 or 6 may be defined as one RBG.

As an example of a method of expressing resource allocation in units of RBG, there is a method of allocating a bit to each of six RBGs constituting the NBG to representing the resource assignment as a bitmap of 6 bits.

The base station 20 may perform allocation in units of RBGs using Resource allocation type 2 in which (6(6+1)/2) allocation patterns are present for six RBGs. In this case, in Step S202 illustrated in FIG. 7, information of five bits which is the number of bits (the following expression) capable of expressing (6(6+1)/2) is transmitted from the base station 20 to the user apparatus 10 for notification of resources in the NBG.

$$\left\lceil \log_2\left(\frac{6(6+1)}{2}\right) \right\rceil = 5 \text{ bits} \qquad \text{[Expression 4]}$$

In Example 1-4, allocation is performed in units of RBGs and it is thus possible to notify of the allocation information using a smaller number of bits.

Comparison in Example 1

FIG. 13 illustrates a table in which the numbers of bits required for notification of resources (the numbers of bits required for designation of an NBG and designation of resources in the NBG) from the base station 20 to the user apparatus 10 are compared with each other in possible combinations of Examples 1-1 to 1-4. In the table, Resource allocation type 2 is used to allocate resources in the NBG.

As illustrated in FIG. 13, for example, when the system bandwidth is 20 MHz and Example 1-1 (designation of an index of an NBG) and Example 1-4 (allocation in units of RBGs) are combined, seven bits are required for notification of resources, and the number of bits is the smallest in all combinations. However, since designation of a wideband is performed in units of NBGs and designation of resources in the wideband is performed in units of RBGs, flexibility of the combination is lower than that of other combinations. On the other hand, when Example 1-2 (designation of a start position of an NBG) and Example 1-3 (allocation in units of PRBs) are combined, 13 bits are required for notification of resources and the number of bits is the largest in all combinations. However, since designation of a wideband is performed in units of start positions and designation of resources in the wideband is performed in units of PRBs, flexibility of the combination is higher than that of other combinations.

Example 2

Example 2 will be described below. As described above, in Example 2, a narrowband mode or a wideband mode is dynamically designated from the base station 20 to the user apparatus 10.

Figure 14:
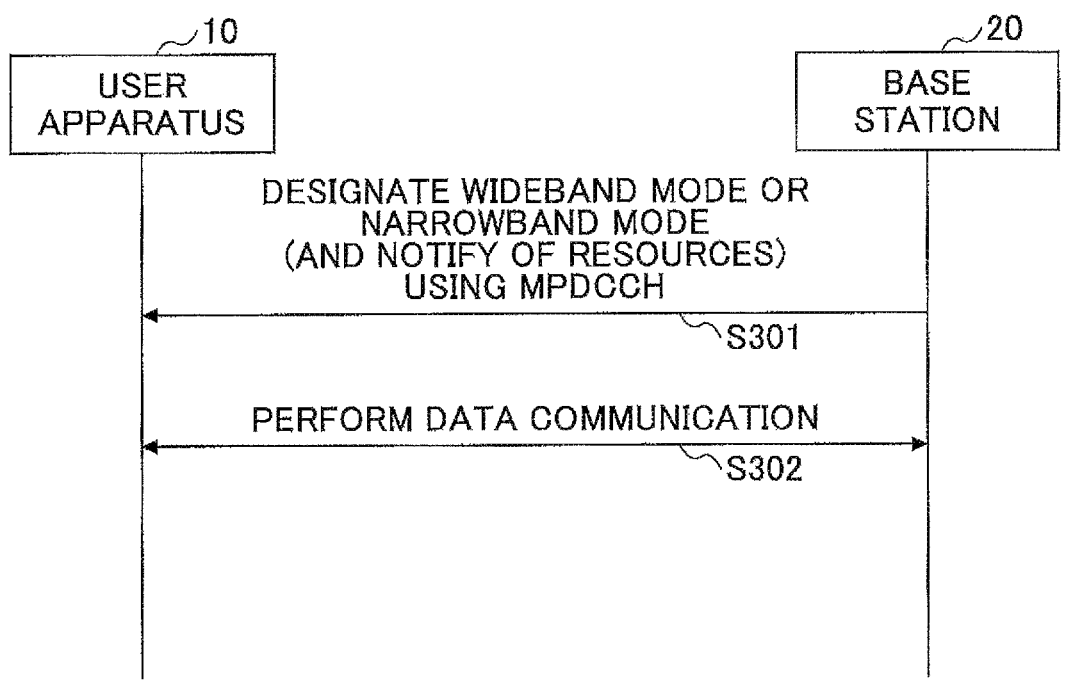
FIG. 14 is a diagram illustrating an outline of a process in Example 2.

First, an outline of processing in Example 2 will be described below with reference to FIG. 14. In Step S301, notification of resources is performed from the base station 20 to the user apparatus 10 using an MPDCCH. What resources (RBs, NBs, or the like) in what wideband (for example, a bandwidth of four NBs) in a system band to use is designated by the notification of resources. The method described in Example 1 can be used for this designation. In addition, in Example 2, notification information of resources includes information for designating a narrowband mode or a wideband mode.

When the user apparatus 10, receiving the notification information of resources in Step S301, detects designation of the narrowband mode from the notification information, the user apparatus 10 interprets that the designation of resources in the notification information is designation of resources in a narrowband and specifies resources on the basis of the interpretation. When the user apparatus 10, receiving the notification information of resources in Step S301, detects designation of the wideband mode from the notification information, the user apparatus 10 interprets that the designation of resources in the notification information is designation of resources in a wideband and specifies resources on the basis of the interpretation.

In Step S302, the user apparatus 10 and the base station 20 perform data communication using the resources designated in Step S301.

Prior to Step S301 (in Example 1, prior to Step S201 in FIG. 7), designation of which of the operation of Example 1 and the operation of Example 2 to perform may be performed from the base station 20 to the user apparatus 10. When the operation of Example 1 is performed, the designation may be performed at the same time as designating a mode in Step S201 in FIG. 7. Also, the operation of Example 1 may be performed when a mode is designated in Step S201 in FIG. 7, and the operation of Example 2 may be performed when a mode is not designated in Step S201 in FIG. 7.

Example 2-1 and Example 2-2 which are different in a method of designating a narrowband mode/wideband mode in resource notification using an MPDCCH will be described below.

Example 2-1

In Example 2-1, the base station 20 includes a mode switching flag (for example, one bit) in notification information (downlink control information (which is referred to as DCI)) using an MPDCCH. The mode switching flag indicates the narrowband mode or the wideband mode.

When the wideband mode is designated by the mode switching flag, the base station 20 includes information for designating an NBG, information for designating resources in the NBG, and dummy bits in addition to the mode switching flag in the downlink control information and transmits the downlink control information including these pieces of information to the user apparatus 10.

The information for designating an NBG is, for example, information indicating an index of an NBG described in Example 1-1 or information indicating a start position of the NBG described in Example 1-2. The information for designating an NBG may be information different from any of the information indicating an index of an NBG described in Example 1-1 and the information indicating a start position of the NBG described in Example 1-2.

The information for designating resources in the NBG is, for example, allocation information in units of PRBs described in Example 1-3 or allocation information in units of RBGs described in Example 1-4. The information for designating resources in the NBG may be information different from any of the allocation information in units of PRBs described in Example 1-3 and the allocation information in units of RBGs described in Example 1-4.

The user apparatus 10 cannot normally decode DCI unless the MPDCCH (DCI) is of a predetermined number of bits. When DCI cannot be normally decoded, it is not possible to determine which mode is designated. Therefore, a dummy bit is added to make the number of bits of DCI to be the predetermined number irrespective of the mode. Note that when the number of bits of the DCI is the predetermined number without adding a dummy bit, it is not necessary to add the dummy bit. No addition of a dummy bit corresponds to addition of zero dummy bit.

In other words, since the DCI cannot be normally decoded unless it has the predetermined number of bits, it is preferable that the sum of the maximum numbers of bits which are used by the mode switching flag, the information for designating an NBG, and the information for designating resources in the NBG is equal to the predetermined number of bits. By determining the predetermined number of bits in this way, any case can be always accommodated in the predetermined number of bits (an MPDCCH (DCI) of the predetermined number of bits may be generated by adding a dummy bit if necessary) and the number of bits always becomes the smallest as the decodable number of bits (a bit length), which is preferable.

When the narrowband mode is designated by the mode switching flag, the base station 20 includes information for designating an NB, information for designating resources in the NB, and dummy bits in addition to the mode switching flag in the downlink control information and transmits the downlink control information including these pieces of information to the user apparatus 10. When the narrowband mode is designated, the same format as existing DCI format 6-1A (for example, see FIG. 15) except for the mode switching flag and the dummy bit can be used.

In Example 2-1, since the mode switching flag is provided separately from the resource allocation information, for example, an existing format can be utilized in the narrowband mode and implementation can be easily realized.

Example 2-2

In Example 2-2, the base station 20 includes information for designating an NBG (an NB in the case of the narrowband mode) and information for designating resources in the NBG (the NB in the case of the narrowband mode) in downlink control information which is transmitted using an MPDCCH, and transmits the downlink control information including these pieces of information to the user apparatus 10. Similarly to Example 2-1, the downlink control information may include a dummy bit for setting the bit length of the DCI to a predetermined length.

The information for designating an NBG is, for example, information indicating an index of an NBG described in Example 1-1 or information indicating a start position of the NBG described in Example 1-2. The information for designating an NBG may be information different from any of the information indicating an index of an NBG described in Example 1-1 and the information indicating a start position of the NBG described in Example 1-2.

In Example 2-2, the information for designating resources in an NBG and the information for designating resources in an NB are set to the same number of bits which is five bits. This is only an example, and the information may have the number of bits other than five bits. Resources are designated by five bits and the narrowband mode or the wideband mode is designated by the range of numerical values expressed by five bits.

Figure 16:
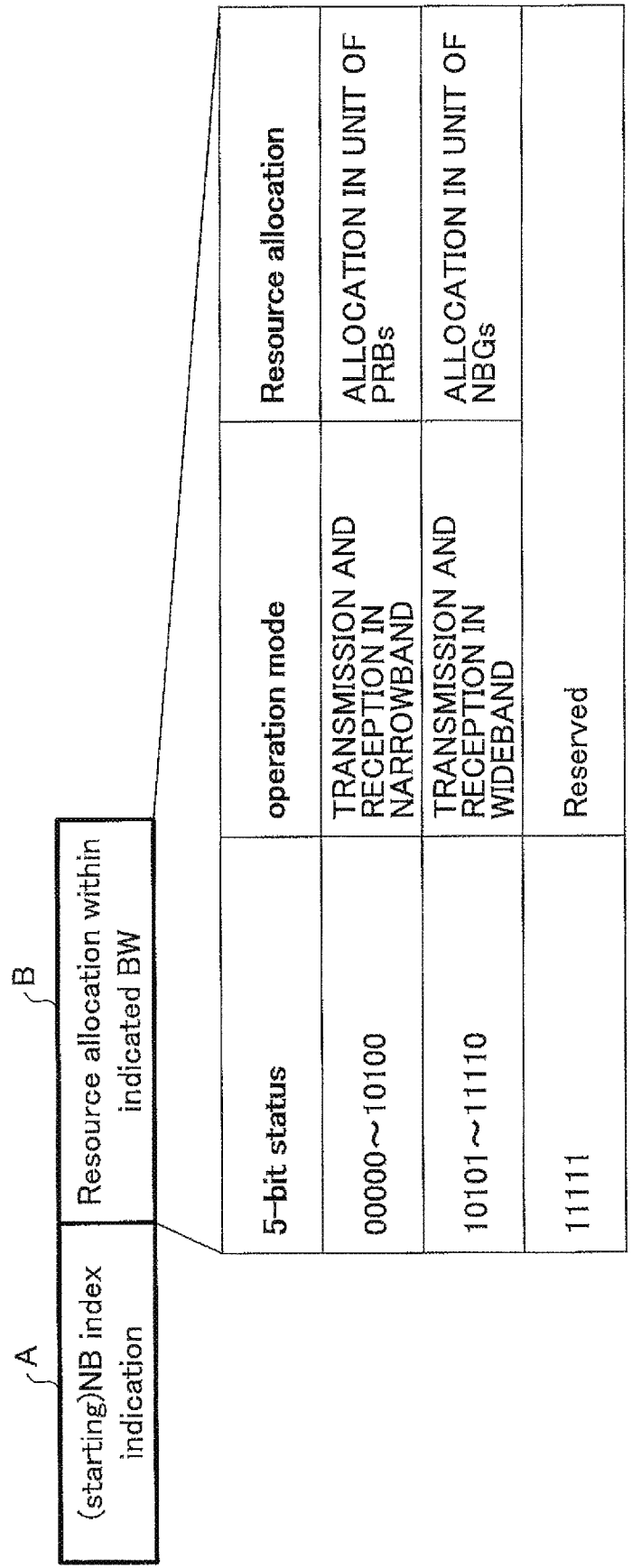
FIG. 16 is a diagram illustrating resource allocation information in Example 2-2.

A specific example is illustrated in FIG. 16. In FIG. 16, A indicates designation of an NBG and designation of a start position is used in this example. As indicated by B and a table illustrating details of B in FIG. 16, when the narrowband mode is designated, a numerical value in a range of 00000 to 10100 (0 to 20) is used for notification of allocation in units of PRBs (Resource allocation type 2, 6×7/2=21 patterns) in an NB. When the wideband mode is designated, a numerical value in a range of 10101 to 11110 (21 to 30) is used for notification of allocation in units of RBGs (where six PRBs constitute one RBG) (Resource allocation type 2, 4×5/2=10 patterns) in an NBG. 11111 represents reserve information.

The user apparatus 10, receiving downlink control information using an MPDCCH and extracting resource allocation information in an NBG (NB), determines that the information is a designation of the narrowband mode and performs data communication using resources corresponding to the allocation in units of PRBs when the information indicates a value in the range of 00000 to 10100, and determines that the information is a designation of the wideband mode and uses resources corresponding to allocation in units of RBGs when the information indicates a value in a range of 10101 to 11110. The base station 20 also performs data communication using the same resources as used by the user apparatus 10.

In Example 2-2, since resource allocation information is used as the mode designation information, it is possible to reduce an amount of information of a control signal from the base station 20 to the user apparatus 10.

(Apparatus Configuration)

An example of the functional configurations of the user apparatus 10 and the base station 20 performing the above-mentioned operations according to this embodiment will be described below.

<User Apparatus 10>

Figure 17:
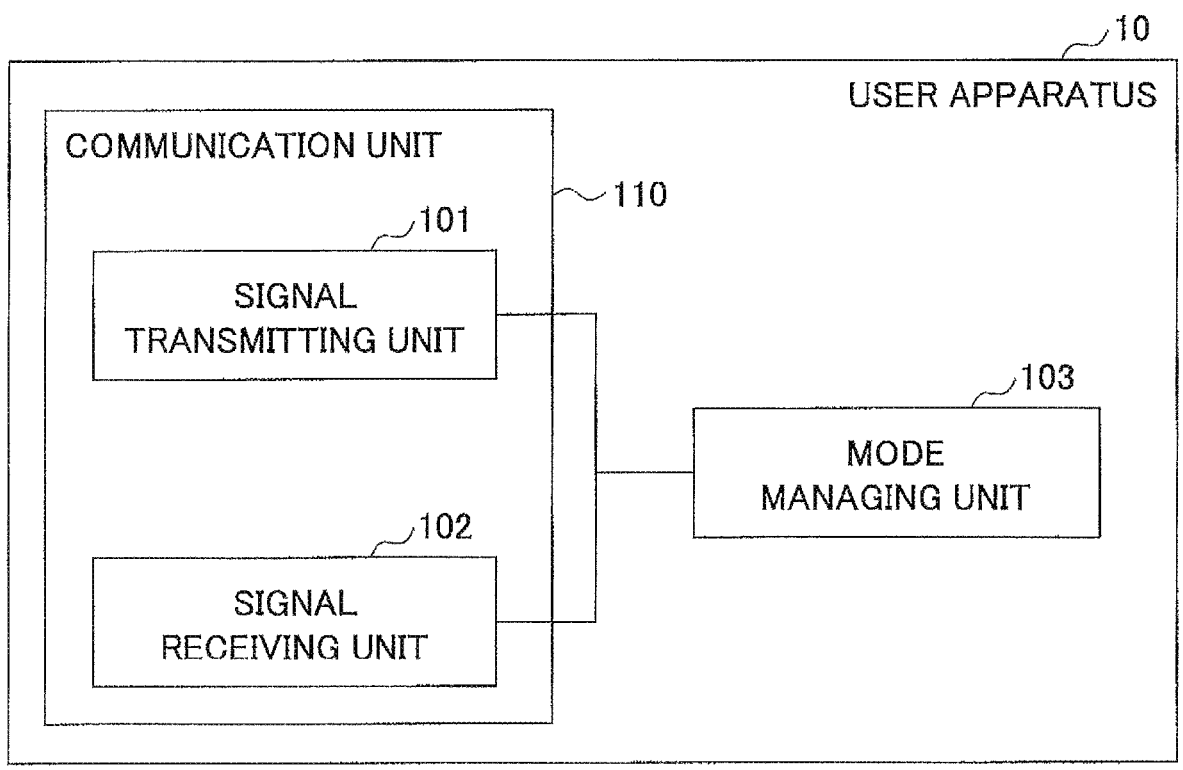
FIG. 17 is a diagram illustrating an example of a functional configuration of a user apparatus 10.

FIG. 17 is a diagram illustrating an example of a functional configuration of the user apparatus 10. As illustrated in FIG. 17, the user apparatus 10 includes a communication unit 110 including a signal transmitting unit 101 and a signal receiving unit 102, and a mode managing unit 103. The functional configuration illustrated in FIG. 17 is only an example. Functional subdivision and names of the functional units are not particularly limited as long as the operations associated with the embodiment can be performed. For example, the mode managing unit 103 may be divided into a reception side and a transmission side, the mode managing unit 103 on the transmission side may be included in the signal transmitting unit 101, and the mode managing unit 103 on the reception side may be included in the signal receiving unit 102.

The signal transmitting unit 101 is configured to convert data to be transmitted from the user apparatus 100 into a signal to be wirelessly transmitted and to wirelessly transmit the signal. The signal receiving unit 102 is configured to wirelessly receive various signals and to acquire data from the received signals. As described above in Example 1 and Example 2, the signal receiving unit 102 receives and decodes an MPDCCH (downlink control information) and the communication unit 110 (the signal transmitting unit 101 or the signal receiving unit 102) performs data communication using resources designated by the downlink control information. That is, the signal receiving unit 102 is configured to receive first designation information for designating a resource group including a plurality of resources each having a bandwidth of a predetermined number of resource blocks and second designation information for designating allocation resources in the resource group from the base station. The communication unit 110 is configured to perform data communication using the allocation resources designated by the second designation information in the resource group designated by the first designation information.

As described above in Example 1 and Example 2, the mode managing unit 103 is configured to determine a mode in which the user apparatus 10 has to operate on the basis of the modes designation information semi-statically or dynamically received from the base station 20 and to instruct the signal transmitting unit 101 or the signal receiving unit to operate in the determined mode.

<Base Station 20>

Figure 18:
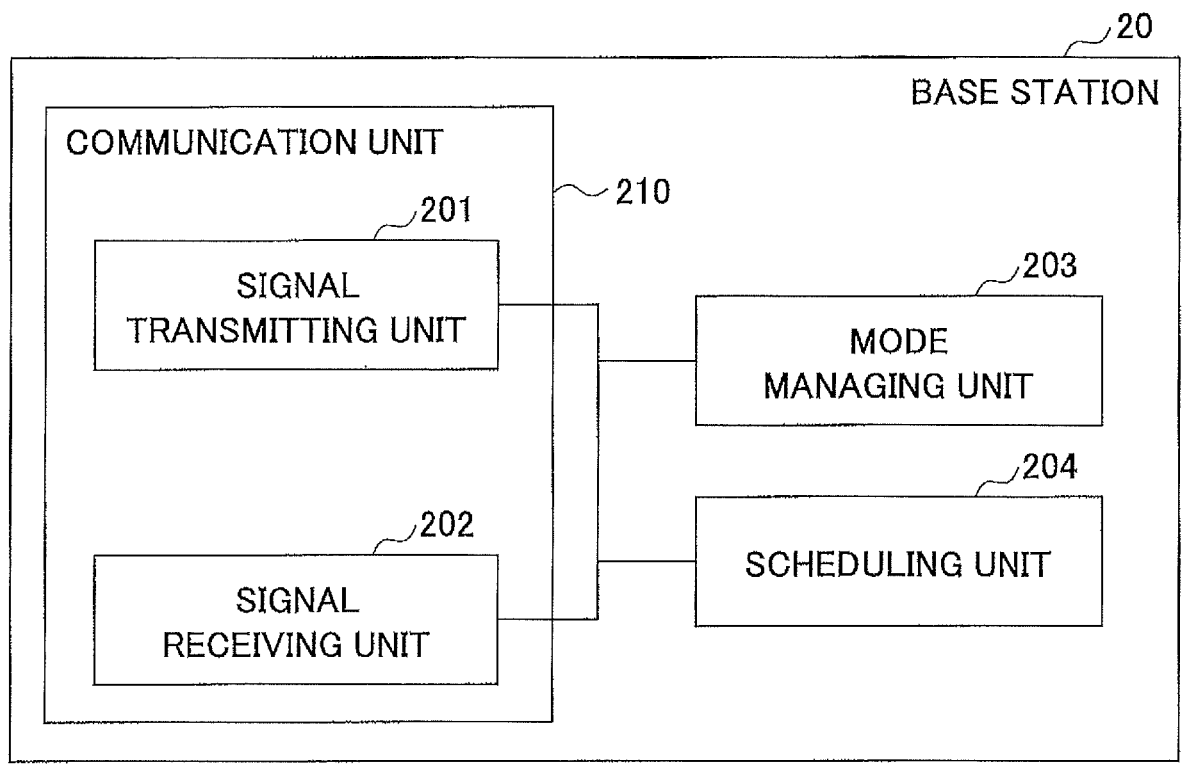
FIG. 18 is a diagram illustrating an example of a functional configuration of a base station 20.

FIG. 18 is a diagram illustrating an example of a functional configuration of the base station 20. As illustrated in FIG. 18, the base station 20 includes a communication unit 210 including a signal transmitting unit 201 and a signal receiving unit 202, a mode managing unit 203, and a scheduling unit 204. The functional configuration illustrated in FIG. 18 is only an example. Functional subdivision and names of the functional units are not particularly limited as long as the operations associated with the embodiment can be performed.

The signal transmitting unit 201 is configured to convert data to be transmitted from the base station 20 into a signal to be wirelessly transmitted and to wirelessly transmit the signal. The signal receiving unit 202 is configured to wirelessly receive various signals and to acquire data from the received signals. As described above in Example 1 and Example 2, the signal transmitting unit 201 transmits an MPDCCH (downlink control information) to the user apparatus 10 and the communication unit 210 (the signal transmitting unit 201 or the signal receiving unit 202) performs data communication using resources designated by the downlink control information. That is, the signal transmitting unit 201 is configured to transmit first designation information for designating a resource group including a plurality of resources each having a bandwidth of a predetermined number of resource blocks and second designation information for designating allocation resources in the resource group to the user apparatus 10. The communication unit 210 is configured to perform data communication using the allocation resources designated by the second designation information in the resource group designated by the first designation information.

The mode managing unit 203 determines mode designation information to be semi-statically or dynamically transmitted to the user apparatus 10 and causes the signal transmitting unit 201 to transmit the mode designation information. The mode managing unit 203 manages (maintains) a mode for each user apparatus.

The scheduling unit 204 determines resources to be used for communication in the user apparatus 10, prepares information (the first designation information and the second designation information) indicating the resources, and causes the signal transmitting unit 201 to transmit the information. The scheduling unit 204 may be included in the signal transmitting unit 201.

<Hardware Configuration>

The block diagrams (FIGS. 17 and 18) which are used above to describe the embodiments illustrate blocks in the units of functions. The functional blocks (constituent units) are embodied in an arbitrary combination of hardware and/or software. Means for embodying the functional blocks is not particularly limited. That is, the functional blocks may be embodied by one unit in which a plurality of components are physically and/or logically coupled, or may be embodied by two or more devices which are physically and/or logically separated and which are connected directly and/or indirectly (for example, in a wired and/or wireless manner).

Figure 19:
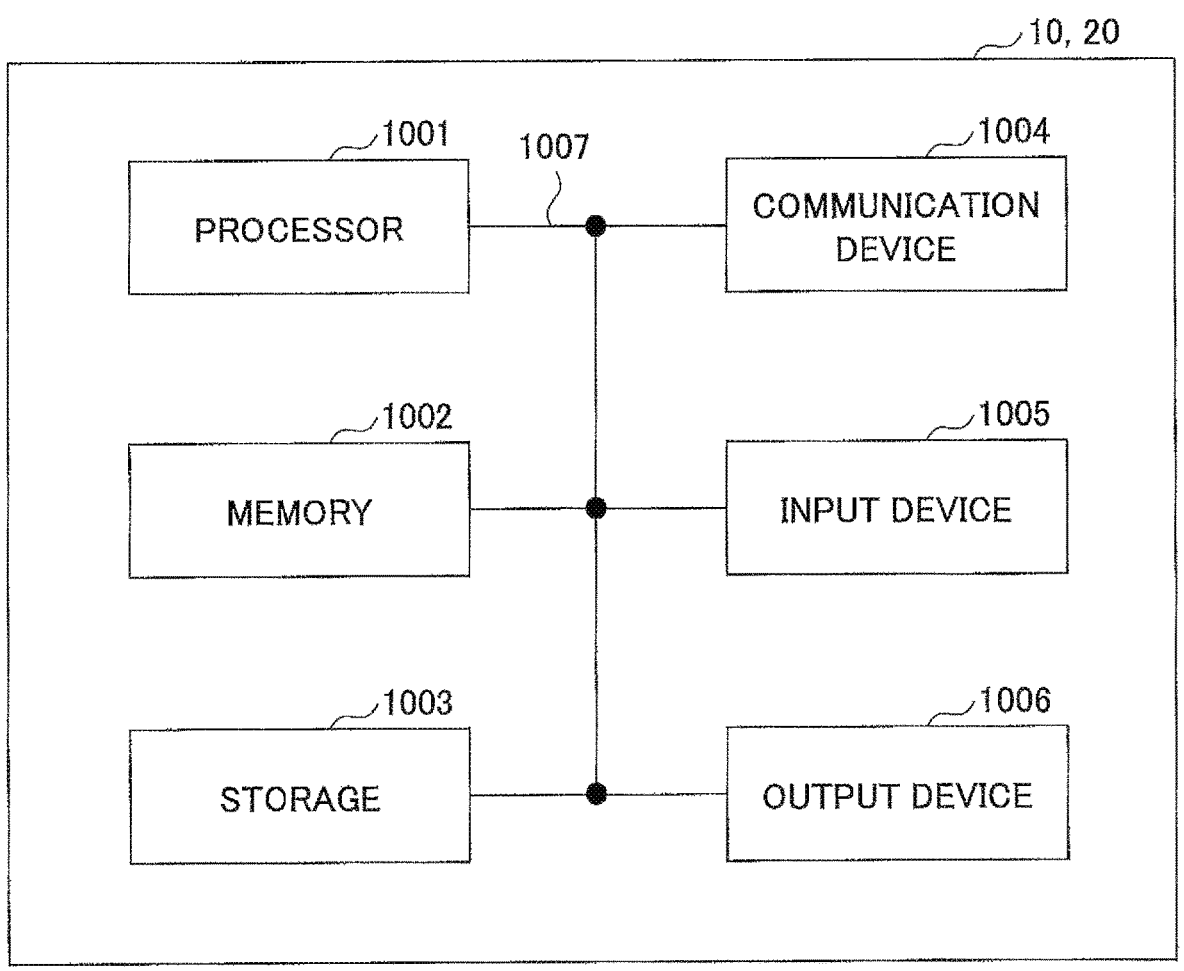
FIG. 19 is a diagram illustrating an example of a hardware configuration of a user apparatus 10 and a base station 20.

For example, the user apparatus 10 and the base station 20 according to this embodiment may function as computers that perform the processes according to this embodiment. FIG. 19 is a diagram illustrating an example of a hardware configuration of the user apparatus 10 and the base station 20 according to this embodiment. The user apparatus 10 and the base station 20 may be physically configured as a computer device including a processor 1001, a memory 1002, a storage 1003, a communication device 1004, an input device 1005, an output device 1006, and a bus 1007.

In the following description, a word "device" may be referred to as a circuit, a device, a unit, or the like. The hardware configurations of the user apparatus 10 and the base station 20 may include one or more devices indicated by reference numerals 1001 to 1006 in the drawing or may not include some devices thereof.

The functions of the user apparatus 10 and the base station 20 are realized by causing hardware such as the processor 1001 and the memory 1002 to read predetermined software (a program) and causing the processor 1001 to perform calculation and to control communication of the communication device 1004 and reading and/or writing of data in the memory 1002 and the storage 1003.

The processor 1001 controls the computer as a whole, for example, by activating an operating system. The processor 1001 may be constituted by a central processing device (CPU: central processing unit) including an interface with peripherals, a control device, a calculation device, a register, and the like.

The processor 1001 reads a program (program codes), a software module, or data from the storage 1003 and/or the communication device 1004 to the memory 1002 and performs various processes in accordance therewith. As the program, a program causing a computer to perform at least a part of the operations described above in the embodiment is used. For example, the signal transmitting unit 101, the signal receiving unit 102, and the mode managing unit 103 of the user apparatus 10 may be embodied by a control program which is stored in the memory 1002 and operated by the processor 1001. The signal transmitting unit 201, the signal receiving unit 202, the mode managing unit 203, and the scheduling unit 204 of the base station 20 may be embodied by a control program which is stored in the memory 1002 and operated by the processor 1001. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage device). The memory 1002 can store a program (program codes), a software module, or the like which can be executed to perform the processes according to the embodiment.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage device. Examples of the recording medium may include a database including the memory 1002 and/or the storage 1003, a server, and another appropriate medium.

The communication device 1004 is hardware (a transceiver device) that allows communication between computers via a wired and/or wireless network and is referred to as, for example, a network device, a network controller, a network card, or a communication module. For example, the communication unit 110 of the user apparatus 10 may be embodied by the communication device 1004. The signal communication unit 210 of the base station 20 may be embodied by the communication device 1004.

The input device 1005 is an input device (such as a keyboard, a mouse, a microphone, a switch, a button, or a sensor) that receives an input from the outside. The output device 1006 is an output device (such as a display, a speaker, or an LED lamp) that performs outputting to the outside. The input device 1005 and the output device 1006 may be configured as a unified body (such as a touch panel).

The devices such as the processor 1001 and the memory 1002 are connected to each other via the bus 1007 for transmitting and receiving information. The bus 1007 may be constituted by a single bus or may be configured by different buses for the devices.

The user apparatus 100 and the base station 200 may be configured to include hardware such as a microprocessor, a digital signal processor (DSP), an application specific integrated circuit (ASIC), a programmable logic device (PLD), or a field programmable gate array (FPGA), or a part or all of the functional blocks may be embodied by the hardware. For example, the processor 1001 may be implemented by at least one hardware module of these.

Summary of Embodiments

As described above, according to the embodiment, there is provided a user apparatus in a radio communication system including a base station and the user apparatus, the user apparatus including: a receiver unit configured to receive, from the base station, first designation information for designating a resource group including a plurality of resources each having a bandwidth of a predetermined number of resource blocks and second designation information for designating allocation resources in the resource group; and a communication unit configured to perform data communication using the allocation resources designated by the second designation information in the resource group designated by the first designation information.

According to this configuration, it is possible to enable a user apparatus supporting narrowband communication to perform wideband communication in a radio communication system which supports the narrowband communication.

The first designation information is, for example, information indicating an index of the resource group or a start position in a frequency domain of the resource group. According to this configuration, it is possible to avoid a great increase in an amount of information of a control signal which is transmitted from a base station to a user apparatus.

The second designation information is, for example, resource allocation information in units of resource blocks in the resource group or resource allocation information in units of resource block groups in the resource group. According to this configuration, it is possible to efficiently designate resources in a resource group.

The receiver unit may be configured to receive information including mode instruction information for instructing an operation in a wideband mode using the resource group or an operation in a narrowband mode not using the resource group and a dummy bit in addition to the first designation information and the second designation information from the base station. According to this configuration, the user apparatus can appropriately perform a communication operation using a mode designated by the base station.

The second designation information may be information for designating the allocation resources and may also be mode instruction information for instructing an operation in a wideband mode using the resource group or an operation in a narrowband mode not using the resource group. According to this configuration, it is possible to instruct a mode without using additional information as the mode instruction information and to reduce an amount of information of a control signal which is transmitted from a base station to a user apparatus.

According to the above-mentioned embodiment, there is provided a base station in a radio communication system including the base station and a user apparatus, the base station including: a transmitter unit configured to transmit, to the user apparatus, first designation information for designating a resource group including a plurality of resources each having a bandwidth of a predetermined number of resource blocks and second designation information for designating allocation resources in the resource group; and a communication unit configured to perform data communication using the allocation resources designated by the second designation information in the resource group designated by the first designation information.

According to this configuration, it is possible to enable a user apparatus supporting narrowband communication to perform wideband communication in a radio communication system which supports the narrowband communication.

Complement of Embodiment

While embodiments of the invention have been described above, the invention disclosed herein is not limited to the embodiments and it will be understood by those skilled in the art that various modifications, corrections, alternatives, substitutions, and the like can be made. While description has been made using specific numerical value examples for the purpose of promoting understanding of the invention, such numerical values are only simple examples and arbitrary appropriate values may be used unless otherwise specified. The sorting of items in the above description is not essential to the invention, details described in two or more items may be combined for use if necessary, or details described in a certain item may be applied to details described in another item (unless incompatible). Boundaries between functional units or processing units in the functional block diagrams cannot be said to be necessarily correspond to boundaries of physical components. Operations of a plurality of functional units may be physically performed by one component, or an operation of one functional unit may be physically performed by a plurality of components. The processing sequences described above may be changed in the order as long as they are not incompatible with each other. For the purpose of convenience of description, while a user apparatus 10 and a base station 20 have been described above with reference to functional block diagrams, such apparatuses may be embodied by hardware, by software, or by combination thereof. Each of software which is executed by a processor of the user apparatus 10 and software which is executed by a processor of the base station 20 in the embodiments of the invention may be stored in an appropriate storage medium such as a random access memory (RAM), a flash memory, a read only memory (ROM), an EPROM, an EEPROM, a register, a hard disk (HDD), a removable disk, a CD-ROM, a database, or a server.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station 20 in this specification may be performed by an upper node thereof in some cases. In a network including one or more network nodes including a base station 20, various operations which are performed to communicate with a user apparatus 10 can be apparently performed by the base station 20 and/or network nodes (for example, an MME or an S-GW can be considered but the network nodes are not limited thereto) other than the base station 20. A case in which the number of network nodes other than the base station 20 is one has been described above, but a combination of plural different network nodes (for example, an MME and an S-GW) may be used.

The aspects described in this specification may be used alone, may be used in combination, or may be switched with implementation thereof.

The user apparatus 10 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 20 may be referred to as an NodeB (NB), an enhanced NodeB (eNB), a gNB, a base station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

While the invention has been described above in detail, it is apparent to those skilled in the art that the invention is not limited to the embodiments described in the specification. The invention can be carried out as modified and changed embodiments without departing from the concept and scope of the invention which are defined by the appended claims. Accordingly, the description in this specification is made for illustrative description and does not have any restrictive meaning.

This application claims the benefit of Japanese Priority Patent Application JP 2016-198532 filed Oct. 6, 2016, and the entire contents of the Patent Application JP 2016-198532 are incorporated herein by reference.

EXPLANATIONS OF LETTERS OR NUMERALS 10 user apparatus
20 base station
101 signal transmitting unit
102 signal receiving unit
103 mode managing unit
110 communication unit
201 signal transmitting unit
202 signal receiving unit
203 mode managing unit
204 scheduling unit
1001 processor
1002 memory
1003 storage
1004 communication device
1005 input device
1006 output device

The invention claimed is:

1. A user apparatus in a radio communication system including a base station and the user apparatus, the user apparatus comprising:
   a receiver that receives, from the base station, first designation information for designating a resource group including a plurality of resources each having a bandwidth of a predetermined number of resource blocks and second designation information for designating allocation resources in the resource group; and
   a processor that performs data communication using the allocation resources designated by the second designation information in the resource group designated by the first designation information,
   wherein the second designation information has a 5-bit length that indicates a numerical value and is information for designating the allocation resources, and is mode instruction information for instructing an operation in a wideband mode using the resource group when the numerical value is included in a first range, and for instructing an operation in a narrowband mode not using the resource group when the numerical value is included in a second range.

2. The user apparatus as claimed in claim 1, wherein the first designation information is information indicating an index of the resource group or a start position in a frequency domain of the resource group.

3. The user apparatus as claimed in claim 1, wherein the second designation information is resource allocation information in units of resource blocks in the resource group or resource allocation information in units of resource block groups in the resource group.

4. The user apparatus as claimed in claim 1, wherein the receiver receives, from the base station, a dummy bit in addition to the first designation information and the second designation information.

5. The user apparatus as claimed in claim 1, wherein
   when the numerical value is not larger than 20, the mode instruction information instructs the operation in the wideband mode, and
   when the numerical value is larger than 20, the mode instruction information instructs the operation in the narrowband mode.

6. A base station in a radio communication system including the base station and a user apparatus, the base station comprising:
   a transmitter that transmits, to the user apparatus, first designation information for designating a resource group including a plurality of resources each having a bandwidth of a predetermined number of resource blocks and second designation information for designating allocation resources in the resource group; and
   a processor that performs data communication using the allocation resources designated by the second designation information in the resource group designated by the first designation information,
   wherein the second designation information has a 5 bit length that indicates a numerical value and is information for designating the allocation resources, and is mode instruction information for instructing an operation in a wideband mode using the resource group when the numerical value is included in a first range, and for instructing an operation in a narrowband mode not using the resource group when the numerical value is included in a second range.

7. The user apparatus as claimed in claim 2, wherein the second designation information is resource allocation information in units of resource blocks in the resource group or resource allocation information in units of resource block groups in the resource group.

8. The user apparatus as claimed in claim 2, wherein the receiver receives, from the base station, a dummy bit in addition to the first designation information and the second designation information.

9. The user apparatus as claimed in claim 3, wherein the receiver receives, from the base station, a dummy bit in addition to the first designation information and the second designation information.

10. The base station as claimed in claim 6, wherein
when the numerical value is not larger than 20, the mode instruction information instructs the operation in the wideband mode, and
when the numerical value is larger than 20, the mode instruction information instructs the operation in the narrowband mode.

* * * * *